(12) United States Patent
Gao et al.

(10) Patent No.: US 11,093,410 B2
(45) Date of Patent: Aug. 17, 2021

(54) CACHE MANAGEMENT METHOD, STORAGE SYSTEM AND COMPUTER PROGRAM PRODUCT

(71) Applicant: EMC Ip Holding Company LLC, Hopkinton, MA (US)

(72) Inventors: Jian Gao, Beijing (CN); Xinlei Xu, Beijing (CN); Lifeng Yang, Beijing (CN); Changyu Feng, Beijing (CN); Yousheng Liu, Beijing (CN); Baote Zhuo, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/021,734

(22) Filed: Jun. 28, 2018

(65) Prior Publication Data
US 2019/0004968 A1 Jan. 3, 2019

(30) Foreign Application Priority Data
Jun. 30, 2017 (CN) .......................... 201710526284.1

(51) Int. Cl.
| | |
|---|---|
| *G06F 3/06* | (2006.01) |
| *G06F 12/00* | (2006.01) |
| *G06F 13/00* | (2006.01) |
| *G06F 12/122* | (2016.01) |
| *G06F 12/0871* | (2016.01) |
| *G06F 12/128* | (2016.01) |
| *G06F 12/123* | (2016.01) |
| *G06F 12/0895* | (2016.01) |

(52) U.S. Cl.
CPC ........ *G06F 12/122* (2013.01); *G06F 12/0871* (2013.01); *G06F 12/0895* (2013.01); *G06F 12/123* (2013.01); *G06F 12/128* (2013.01); *G06F 2212/222* (2013.01); *G06F 2212/60* (2013.01)

(58) Field of Classification Search
CPC .. G06F 12/122; G06F 12/0871; G06F 12/123; G06F 12/128
USPC ....................................... 711/133
See application file for complete search history.

(56) References Cited

U.S. PATENT DOCUMENTS

| | | | | |
|---|---|---|---|---|
| 7,631,023 | B1 * | 12/2009 | Kaiser | .................... G06F 3/061 |
| 8,468,292 | B2 * | 6/2013 | Aszmann | .............. G06F 3/0688 |
| | | | | 711/103 |
| 8,560,759 | B1 * | 10/2013 | Boyle | ................. G06F 12/0246 |
| | | | | 711/101 |
| 9,122,589 | B1 | 9/2015 | Bono et al. | |
| 9,311,207 | B1 * | 4/2016 | Marshak | ............. G06F 11/3048 |

(Continued)

OTHER PUBLICATIONS

EMC Fast Cache: A Detailed Review; EMC Corporation, Oct. 2011.

*Primary Examiner* — Mohamed M Gebril
(74) *Attorney, Agent, or Firm* — BainwoodHuang

(57) ABSTRACT

Embodiments of the present disclosure provide a cache management method, storage system and computer program product. The cache management method includes determining an access frequency for each of a plurality of cache pages in a storage system. The method further includes organizing the plurality of cache pages into a plurality of queues based on the access frequency. The method further includes allocating solid-state disks for the plurality of queues based on the access frequency, so that queues where pages with higher access frequency are located have more solid state disks.

18 Claims, 14 Drawing Sheets

(56) References Cited

U.S. PATENT DOCUMENTS

| | | | |
|---|---|---|---|
| 9,612,758 B1 | 4/2017 | Liu et al. | |
| 9,864,683 B1 | 1/2018 | Xu et al. | |
| 9,880,744 B1* | 1/2018 | Dalal | G06F 3/065 |
| 10,095,425 B1* | 10/2018 | Martin | G06F 3/0665 |
| 2002/0069320 A1* | 6/2002 | Yagi | G06F 3/0635 |
| | | | 711/112 |
| 2004/0068612 A1* | 4/2004 | Stolowitz | G06F 11/1076 |
| | | | 711/114 |
| 2010/0241792 A1* | 9/2010 | Lee | G06F 12/0246 |
| | | | 711/103 |
| 2011/0072206 A1* | 3/2011 | Ross | G06F 16/173 |
| | | | 711/108 |
| 2012/0254508 A1* | 10/2012 | Walls | G06F 3/0688 |
| | | | 711/103 |
| 2013/0019057 A1* | 1/2013 | Stephens | G06F 3/0638 |
| | | | 711/103 |
| 2013/0103978 A1* | 4/2013 | Akutsu | G06F 11/1076 |
| | | | 714/6.23 |
| 2013/0254482 A1* | 9/2013 | Ishizaki | G06F 3/0665 |
| | | | 711/114 |
| 2013/0290281 A1* | 10/2013 | Yokoi | G06F 3/0685 |
| | | | 707/693 |
| 2014/0082288 A1* | 3/2014 | Beard | G06F 3/0671 |
| | | | 711/123 |
| 2015/0160858 A1* | 6/2015 | Okada | G06F 3/0631 |
| | | | 711/114 |
| 2015/0261462 A1* | 9/2015 | Miwa | G06F 3/0629 |
| | | | 711/114 |
| 2016/0124652 A1* | 5/2016 | Adamson | G06F 12/08 |
| | | | 711/171 |
| 2016/0132433 A1* | 5/2016 | Hayashi | G06F 3/067 |
| | | | 711/118 |
| 2016/0132502 A1* | 5/2016 | Balasa Ramnath | G06F 16/284 |
| | | | 707/689 |
| 2016/0179379 A1* | 6/2016 | Hoffman | G06F 12/08 |
| | | | 711/103 |
| 2016/0231948 A1* | 8/2016 | Gupta | G06F 3/067 |
| 2016/0378654 A1* | 12/2016 | Chambliss | G06F 3/0649 |
| | | | 711/122 |
| 2017/0004086 A1* | 1/2017 | An | G06F 3/06 |
| 2017/0097784 A1* | 4/2017 | Iida | G06F 3/0653 |
| 2017/0123686 A1* | 5/2017 | Pinto | G06F 3/0652 |
| 2017/0255554 A1* | 9/2017 | Han | G06F 12/0811 |
| 2018/0089095 A1* | 3/2018 | Li | G06F 12/0882 |

\* cited by examiner

CACHE MANAGEMENT METHOD, STORAGE SYSTEM AND COMPUTER PROGRAM PRODUCT

RELATED APPLICATIONS

This application claim priority from Chinese Patent Application Number CN 201710526284.1, filed on Jun. 30, 2017 at the State Intellectual Property Office, China, titled "CACHE MANAGEMENT METHOD, STORAGE SYSTEM AND COMPUTER PROGRAM PRODUCT" the contents of which is herein incorporated by reference in its entirety.

FIELD

Embodiments of the present disclosure generally relate to the field of data storage, and more specifically, to a cache management method, storage system and computer program product.

BACKGROUND

Cache is a special type of memory sub-system in which frequently used data are replicated to facilitate fast access by CPU. Dynamic random access memory (DRAM) cache improves the performance of the storage system by storing data transparently in a very fast storage medium (such as DRAM), so that the request for the data can be served quickly, typically around 60 microseconds. However, for DRAM, the cost per GB is very high, and there is hardware limitation in the capacity of the DRAM cache, generally several GBs or tens of GBs.

Solid-state disk (SSD) cache improves the performance of the storage system by storing data transparently in SSD, so that request for the data can be served quickly, typically less than 1 millisecond. SSD cache is not as fast as DRAM cache but its cost is lower than DRAM cache. The current SSD cache is generally designed as read-preference SSD cache or as RAID-1 SSD cache. However, both of these two types of SSD caches have their own shortcomings in actual use.

SUMMARY

Embodiments of the present disclosure provide a cache management scheme.

According to a first aspect of the present disclosure, a method of cache management is provided, including: determining access frequency for each of a plurality of cache pages in a storage system. The method further includes organizing the plurality of cache pages into a plurality of queues based on the access frequency. The method further includes allocating solid-state disks for the plurality of queues based on the access frequency such that a queue where a page with higher access frequency is located has more solid-state disks.

According to a second aspect of the present disclosure, a storage system is provided, including a plurality of solid-state disks and a controller. The controller is configured to determine access frequency for each of a plurality of cache pages in the storage system. The controller is further configured to organize the plurality of cache pages into a plurality of queues based on the access frequency. The controller is further configured to allocate solid-state disks for the plurality of queues based on the access frequency such that a queue where a page with higher access frequency is located has more solid state disks.

According to a third aspect of the present disclosure, a computer program product is provided. The computer program product is tangibly stored on a non-transient computer readable medium and includes machine executable instructions, the machine executable instructions, when executed, causing the machine to implement any step of the method depicted according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In the example embodiments of the present disclosure, the same reference signs usually represent the same components.

DETAILED DESCRIPTION OF EMBODIMENTS

Figure 1:
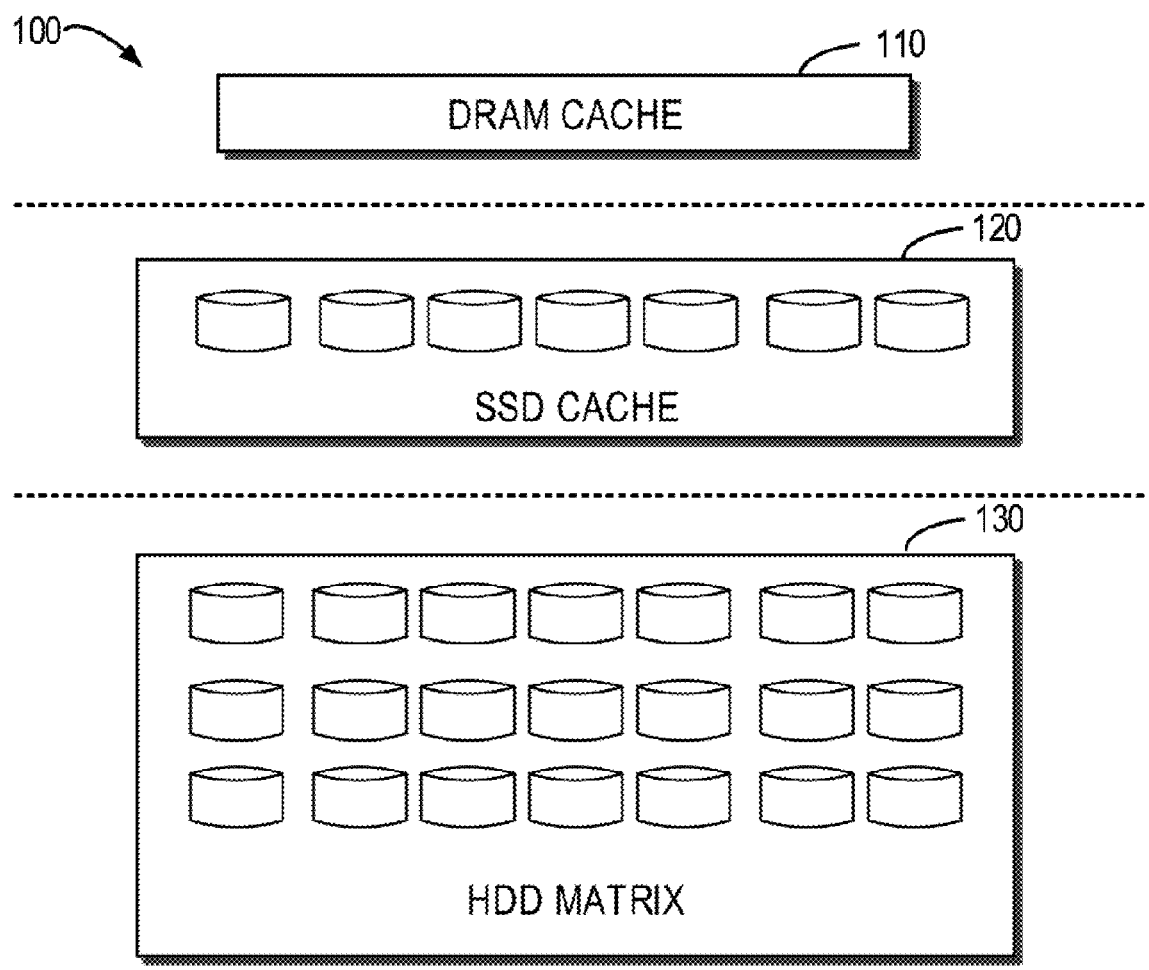
FIG. 1 is a schematic diagram illustrating a conventional environment including SSD cache.

Principles of the present disclosure will be described with reference to various example embodiments illustrated in the drawings. Although illustrative embodiments of the present disclosure are displayed in the drawings, it shall be appreciated that these embodiments are only provided to enable those skilled in the art to better understand and further implement the present disclosure, rather than to limit the scope of the present disclosure in any manner.

FIG. 1 is a schematic diagram illustrating a conventional storage environment 100 including a cache. The environment 100 includes a dynamic random access memory (DRAM) cache 110, a solid-state disk (SSD) cache 120 and a disk drive (HHD) matrix 130. Generally, DRAM cache 110 is at the top of the 10 data path and SSD cache 120 is below the DRAM cache 110, while HDD matrix is below the SSD cache 120.

DRAM cache 110 can improve the performance of the storage system by storing data transparently in DRAM so that request for data can be served quickly, typically around 60 microseconds. Generally, DRAM cache 110 caches the most frequently accessed data (hottest data). However, the costs of DRAM cache are very high, about 8-10 dollars per GB, and there is hardware limitation for the capacity of DRAM cache, for instance, memory slot limitation and battery duration limitation. The capacity of DRAM cache is generally about several GBs or tens of GBs.

SSD cache 120 improves the performance of the storage system by storing data transparently in the SSD so that the request for data can also be served quickly, typically less than 1 millisecond. SSD cache 120 usually caches second most frequently accessed data. Compared with DRAM cache, SSD cache has lower cost and larger capacity. For SSD cache, the cost per GB ranges from 1 dollar to several dollars, depending on the used technology. Typically, the capacity of SSD cache reaches the magnitude of hundreds of GBs or even as high as TB.

HDD matrix 130 is comprised by HDDs for storing all user data and serving for I/O requests not processed by DRAM cache 110 and SSD cache 120, and it provides the longest response time. A plurality of HDDs are generally organized into disk arrays to provide open capacity and redundancy. Some disk arrays may provide a capacity with a magnitude of hundreds of TBs or even PBs.

In the environment 100 shown in FIG. 1, there exist two types of cache hits, namely, DRAM cache hit and SSD cache hit. For an I/O request entering the storage system, the DRAM cache 110 first searches its cached data. If DRAM cache 110 finds a hit, then it uses the cached data to respond to the I/O request. Otherwise, if DRAM cache 110 finds a miss, then it forwards the I/O request to the SSD cache 120.

In response to receiving the I/O request forwarded by the DRAM cache 110, the SSD cache 120 searches its cached data. If SSD cache 120 finds a hit, it uses the cached data to respond to the I/O request. Otherwise, if SSD cache 120 finds a miss, then it forwards the I/O request to HDD matrix 130. After that, data that the I/O request is targeted for are read from the HDD matrix 130 or data related to the I/O request are written into the HDD matrix 130.

The existing SSD cache utilized in environment 100 is generally implemented as read-preference SSD cache or RAID-1 SSD cache. Both these two types of SSD caches have their respective shortcomings. These two existing structures and their respective shortcomings will be described below with reference to FIGS. 2, 3, 4, and 5.

Figure 2:
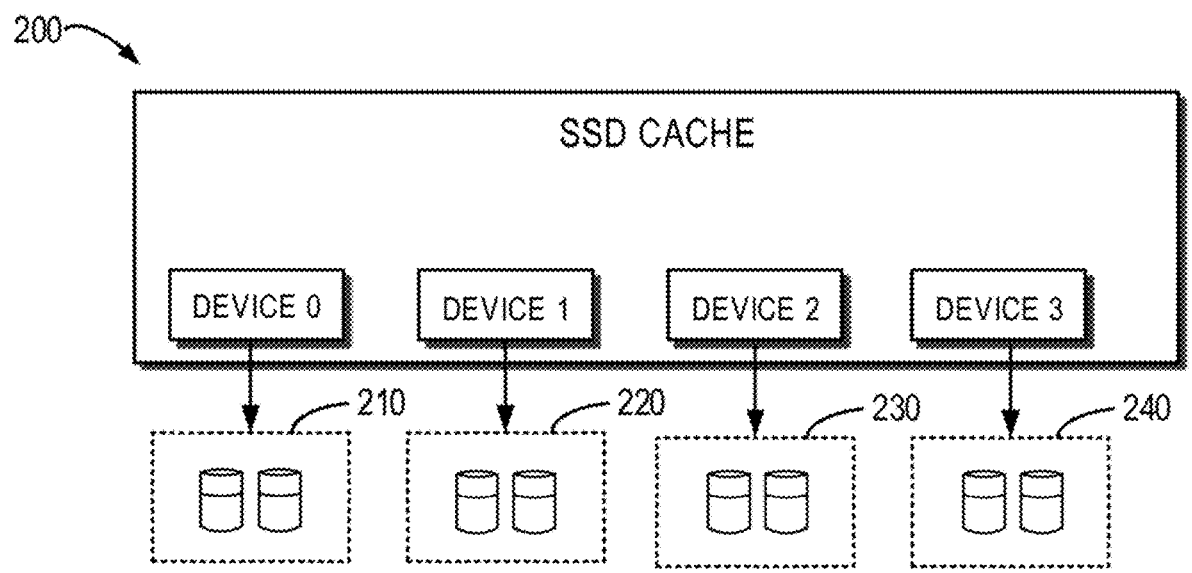
FIG. 2 is a schematic diagram of a hardware architecture of existing RAID-1 SSD cache.

FIG. 2 is a schematic diagram of a hardware architecture of existing RAID-1 SSD cache 200. In the SSD cache 200 shown in FIG. 2, two SSDs are combined into one RAID-1 group to provide a single SSD space to cache user data, and the RAID-1 group may be used for read/write cache. Each SSD stores user data and metadata associated with the cache page. For example, the metadata may include the state of the cache page ("dirty" or "clean"), and mapping information associated with the cache page and the like. In the SSD cache 200, each RAID-1 group is considered as a separate device, such as device 0 210, device 1 220, device 2 230 and device 3 240. If dirty data exist in the SSD cache 200, then RAID-1 group can ensure that data will not be lost when one SSD is broken.

Figure 3:
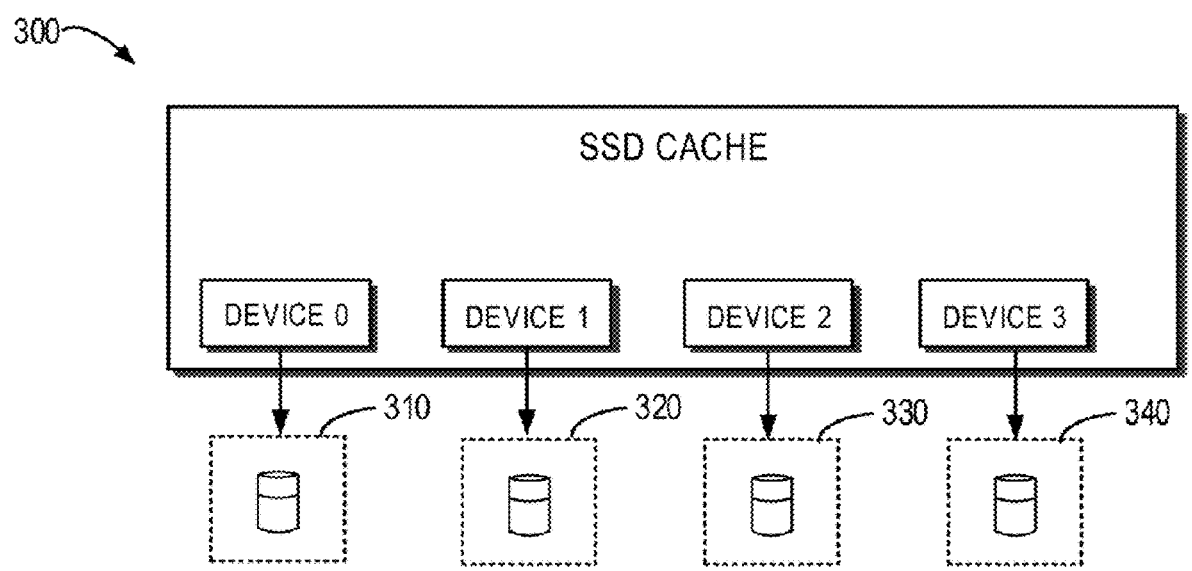
FIG. 3 is a schematic diagram of a hardware architecture of existing read-preference SSD cache.

FIG. 3 is a schematic diagram of a hardware architecture of an existing read-preference SSD cache 300. In the read-preference SSD cache 300, each SSD serves as a separate device (such as device 0 310, device 1 320, device 2 330 and device 3 340) to provide a storage space for the read-preference SSD cache 300. Each SSD stores user data and metadata associated with cache page, for example, including status of the cache page ("dirty" or "clean"), and mapping information associated with cache page and so on.

Figure 4:
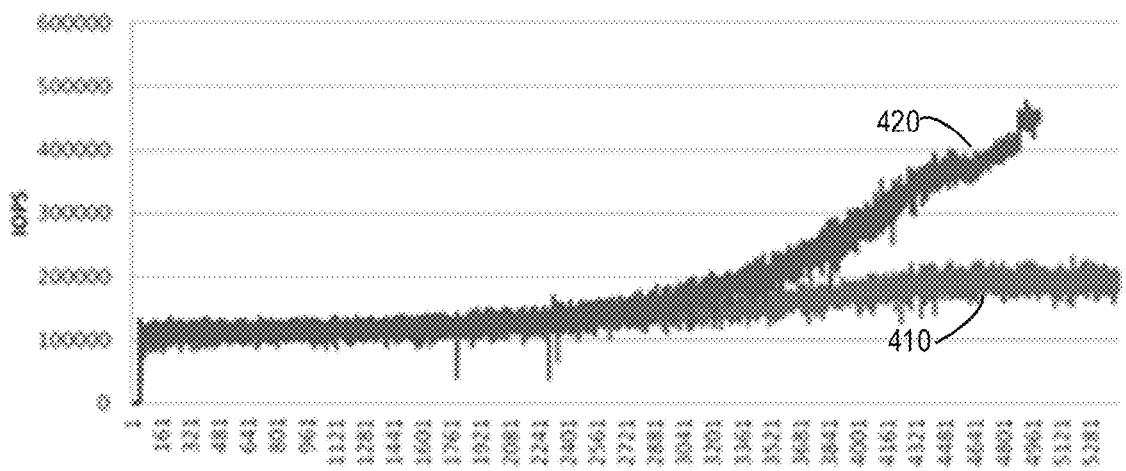
FIG. 4 is a schematic diagram of performance comparison of RAID-1 SSD cache and read-preference SSD cache.

It has been realized that these two architectures shown in FIG. 2 and FIG. 3 have their respective shortcomings. For RAID-1 SSD cache, if most of the user IOs are read IOs, then the majority of the SSD disk space will be wasted because the RAID-1 group only exposes a half of a disk space of the two SSDs. If the data region frequently accessed by the user is larger than SSD cache, then SSD cache will be busy promoting the HDD pages and flushing the cache pages to HDD, which would cause a large quantity of internal IOs, thus reducing the overall performance of the disk array, as illustrated in FIG. 4. FIG. 4 shows a schematic diagram illustrating performance comparison between RAID-1 SSD cache and read-preference SSD cache, where the data region frequently accessed by the user is twice the size of the RAID-1 SSD cache, curve 410 represents the performance of RAID-1 SSD cache, and curve 420 represents the performance of the read-preference SSD cache. As can be seen from FIG. 4, if the data region frequently accessed by the user is twice the size of the RAID-1 SSD cache, the performance of the RAID-1 SSD cache will be worse than that of the read-preference SSD cache.

Figure 5:
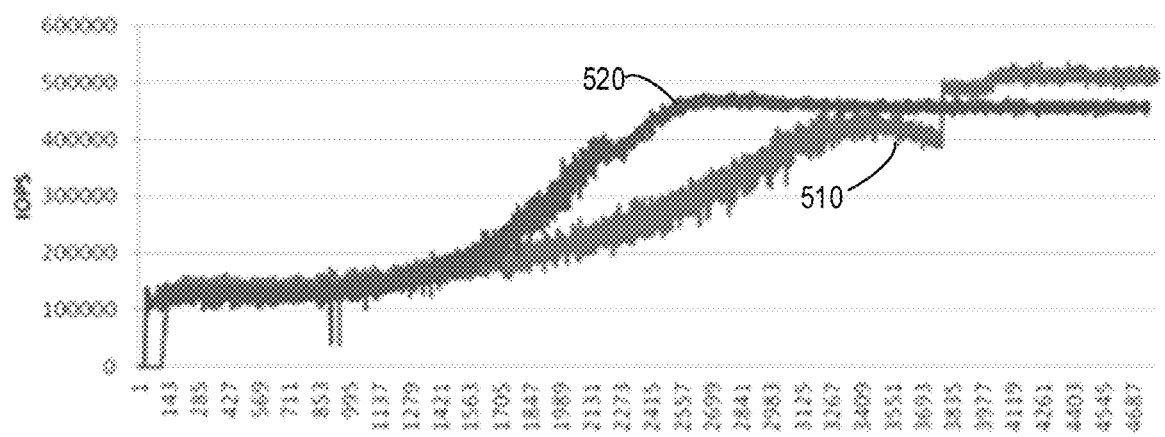
FIG. 5 is a schematic diagram of performance comparison of RAID-1 SSD cache and read-preference SSD cache.

On the other hand, if the data region frequently accessed by the user is almost equal to the size of the RAID-1 SSD cache, then in the case that the cache fully warms up, the performance of the read-preference cache will not be as good as RAID-1 SSD cache, as illustrated in FIG. 5, because in the RAID-1 SSD cache, the cache pages are stored in two SSDs so that the cache pages are redundant, thereby making more SSDs available to serve for IOs. FIG. 5 illustrates a schematic diagram of performance comparison of RAID-1 SSD cache and read-preference SSD cache, where the data region frequently accessed by user is almost the size of RAID-1 SSD cache, curve 510 represents the performance of the RAID-SSD cache and curve 520 represents the performance of the read-preference SSD cache. As can be seen from FIG. 5, if the data region frequently accessed by the user is equal to or less than the RAID-1 SSD cache, after the system fully warms up, the performance of the read-preference SSD cache will be worse than that of the RAID-1 SSD cache.

The present disclosure provides a scheme of performing automatic duplication in a read-preference SSD cache using a multi-queue cache page managing structure to avoid frequently accessed data in the cache being lost when one SSD is broken. The scheme can automatically distribute cache pages in different SSDs, automatically identify the hottest and hotter cache pages, and can accelerate the speed of responding to the request for the hottest or hotter cache pages when one SSD is broken. In this scheme, the cache pages are managed with a plurality of queues Q0~Qn and different queues are used to store cache pages with different access frequencies. For example, the cache pages in queue Qn are the most frequently accessed, and cache pages in queue Qn−1 are second frequently accessed, and so on. The copies of pages in the same queue will be stored in the same number of solid-state disks and copies of pages in different queues will be stored in different number of solid-state disks so that the more frequently accessed pages have copies in a larger number of solid-state disks. If the access frequency of a cache page in a queue reaches a certain extent or meets other requirements, then the cache page is moved from this queue to one with higher level, so that this cache page has copies in more SSDs. Conversely, if the access frequency of the cache page in a queue decreases to a certain extent, then the cache page may be demoted from this queue to one with lower level, so that this cache page has copies in a smaller number of SSDs.

Figure 6:
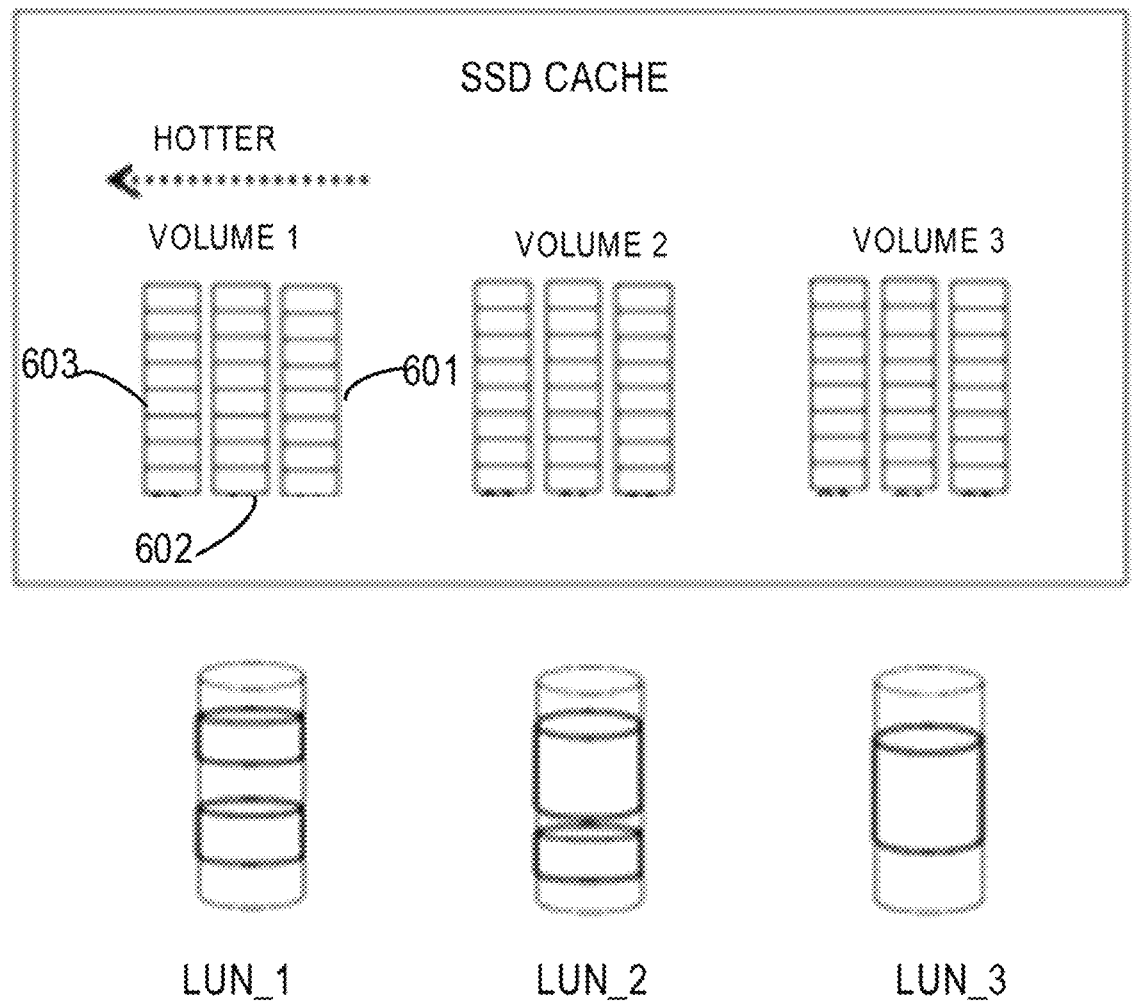
FIG. 6 is a schematic diagram of a cache page management structure used in the example embodiments of the present disclosure.

FIG. 6 shows a schematic diagram illustrating a cache page managing structure used in the example embodiments of the present disclosure. As shown in FIG. 6, each cache logic unit number (LUN) has a volume structure to manage cache pages for this LUN. Each volume has three queues 601, 602 and 603. Comparatively, queue 603 is used for storing the cache page with the highest access frequency, and cache page in the queue 603 will have copies in four SSDs; queue 602 is used for storing the cache page with the second highest access frequency, and the page in the queue 602 will have copies in two SSDs; queue 601 is used to store the cache page that has a relatively low access frequency, and the cache page in queue 601 will have a copy in one SSD.

In some embodiments, the queue where a cache page is located may also be moved dynamically according to the dynamic change of the access frequency of the cache page. If the number of hits of the cache page in the queue 601 exceeds a threshold during a predetermined period of time, then the cache page may be moved to queue 602. Similarly, if the number of hits of the cache page in the queue 602 meets a certain requirement within a predetermined period of time, then the cache page may be moved to the queue 603. If the page in the queue 603 is not accessed or the access number decreases to a certain extent within a period of time, the page may be moved from the queue 603 to the queue 602, and then the copies of the page are reduced from 4 to 2; if the cache page is demoted from queue 602 to queue 601, the number of copies of the cache page will be reduced to 1.

The embodiments of the present disclosure may store cache pages with different access frequencies using the multi-queue structure shown in FIG. 6, so that the cache page with higher access frequency has copies in more SSDs. For frequently accessed cache pages, it is possible to obtain copies of this cache page from a plurality of SSDs so as to respond to the I/O requests for this page quickly. Besides, since cache pages with higher access frequency have more than one copy, when one SSD is broken, these cache pages at least have copies in other SSDs, which ensures that the access speed for these cache pages will not be affected when one SSD is broken.

It shall be understood that although only three queues are illustrated in FIG. 6, any number of queues might be used without departing from the scope of the present disclosure. The number of the copies is not limited to 4, 2 or 1, but can be any other number.

Figure 7:
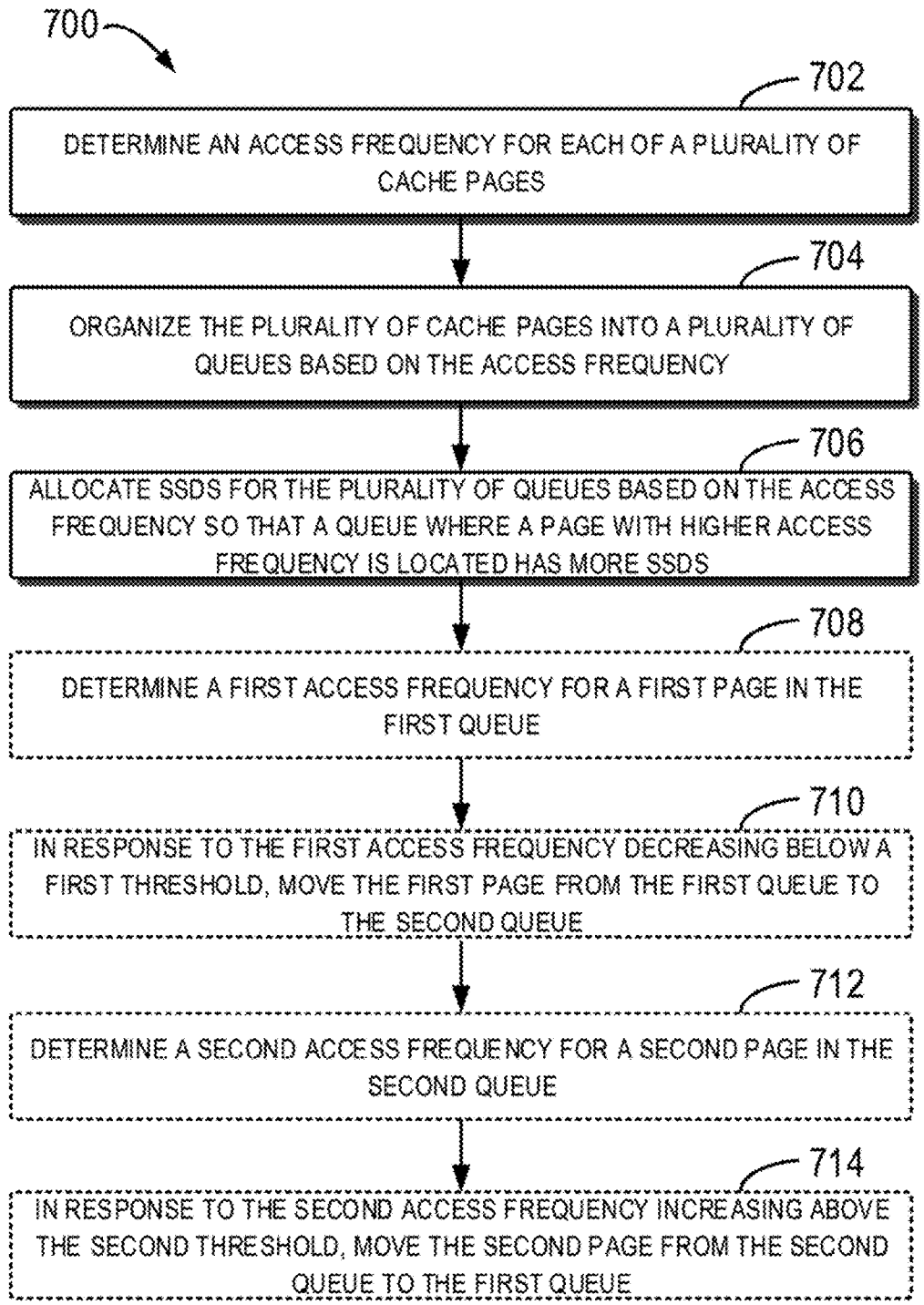
FIG. 7 is a flowchart of a method of cache management according to the example embodiments of the present disclosure.

The method for managing the cache with the structure illustrated in FIG. 6 will be described below with reference to FIG. 7. FIG. 7 shows a method 700 of cache management according to the example embodiments of the present disclosure. At block 702, access frequency for each of a plurality of cache pages is determined. In the example embodiment, the access frequency of a cache page may be determined by counting the requests for accessing the cache page within a predetermined period of time.

At block 704, the plurality of cache pages are organized into a plurality of queues based on the determined access frequency. In the example embodiment, three queues 601, 602 and 603 illustrated in FIG. 6 are taken as an example. Cache pages with an access frequency greater than the first threshold are put in the queue 603, and cache pages with an access frequency less than the first threshold but greater than the second threshold are put in the queue 602, and cache pages with an access frequency less than the second threshold are put in the queue 601.

Figure 8:
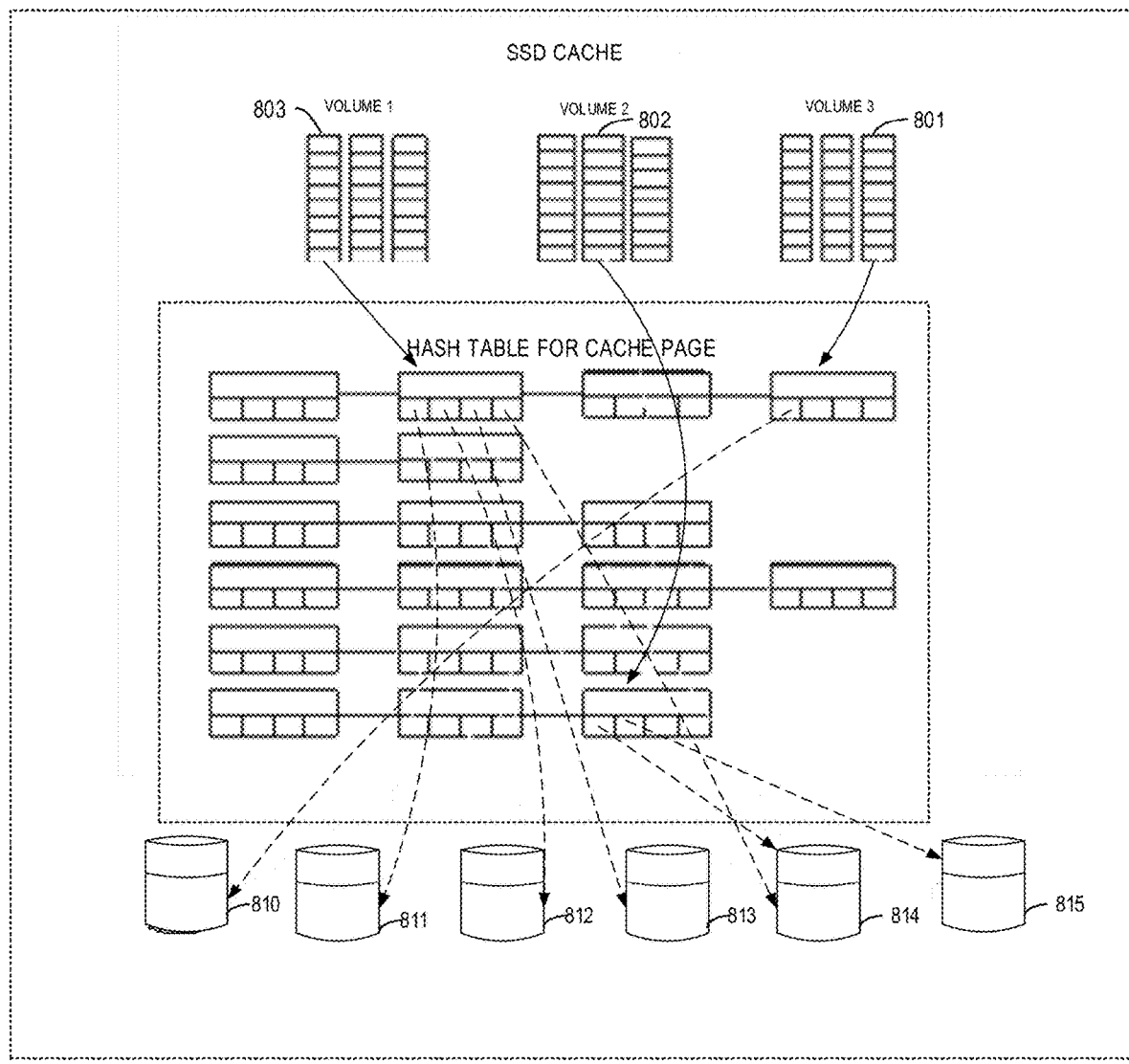
FIG. 8 is a schematic diagram illustrating a mapping relation between cache pages and SSD devices according to the example embodiments of the present disclosure.

At block 706, solid-state disks are allocated to the plurality of queues based on the determined access frequency so that the queues where the pages with higher access frequency are located have more solid-state disks. Take the three queues 601, 602 and 603 shown in FIG. 6 as an example. The queue 601 may be allocated with solid-state disks with a number of 1 so that cache pages in the queue 601 have copies in one solid-state disk; solid-state disks with a number of 2 may be allocated to the queue 602 so that cache pages in queue 602 have copies in two solid-state disks; solid-state disks with a number of 4 may be allocated to queue 603 so that the cache pages in queue 603 have copies in four solid-state disks. FIG. 8 shows a schematic diagram illustrating mapping relation between the cache pages and the SSDs. For example, the pages in the queue 803 of volume 1 are mapped to solid-state disks 811, 812, 813 and 814 so that the pages have copies in the four solid-state disks; the pages in the queue 802 of volume 2 are mapped to solid-state disks 814 and 815 so that the pages have copies in the solid-state disks 814 and 815; the pages in queue 801 of volume 3 are mapped to the solid-state disk 810 so that the pages have copies in the solid-state disk 810.

Continuing to refer to FIG. 7, in some actual applications, the access frequency for a cache page generally changes dynamically. Therefore, in some embodiments, the method 700 may further include optional blocks 708, 710, 712 and 714 in order to dynamically adjust the queues where the cache pages are located according to the dynamic changes of the access frequency, thereby managing the cache in real-time. In example embodiments of the present disclosure, the plurality of queues include a first queue allocated with a first number of solid-state disks and a second queue allocated with a second number of solid-state disks, where the first number is larger than the second number. At block 708, a first access frequency for a first page in the first queue may be determined. At block 710, it is possible to adjust the first page from the first queue to the second queue in response to the first access frequency decreasing below the first threshold. Moving the first page from the first queue to the second queue may include: storing data in the first page to a second number of solid-state disks, so that the first page has copies in the second number of solid-state disks; and updating the metadata associated with the first page.

At block 712, a second access frequency for a second page in the second queue may be determined. At block 714, in response to the second access frequency increasing above the second threshold, the second page may be moved from the second queue to the first queue. Moving the second page from the second queue to the first queue may include: storing data in the second page to a first number of solid-state disks, so that the second page has copies in the first number of solid state disks; and updating metadata associated with the second page.

Figure 9:
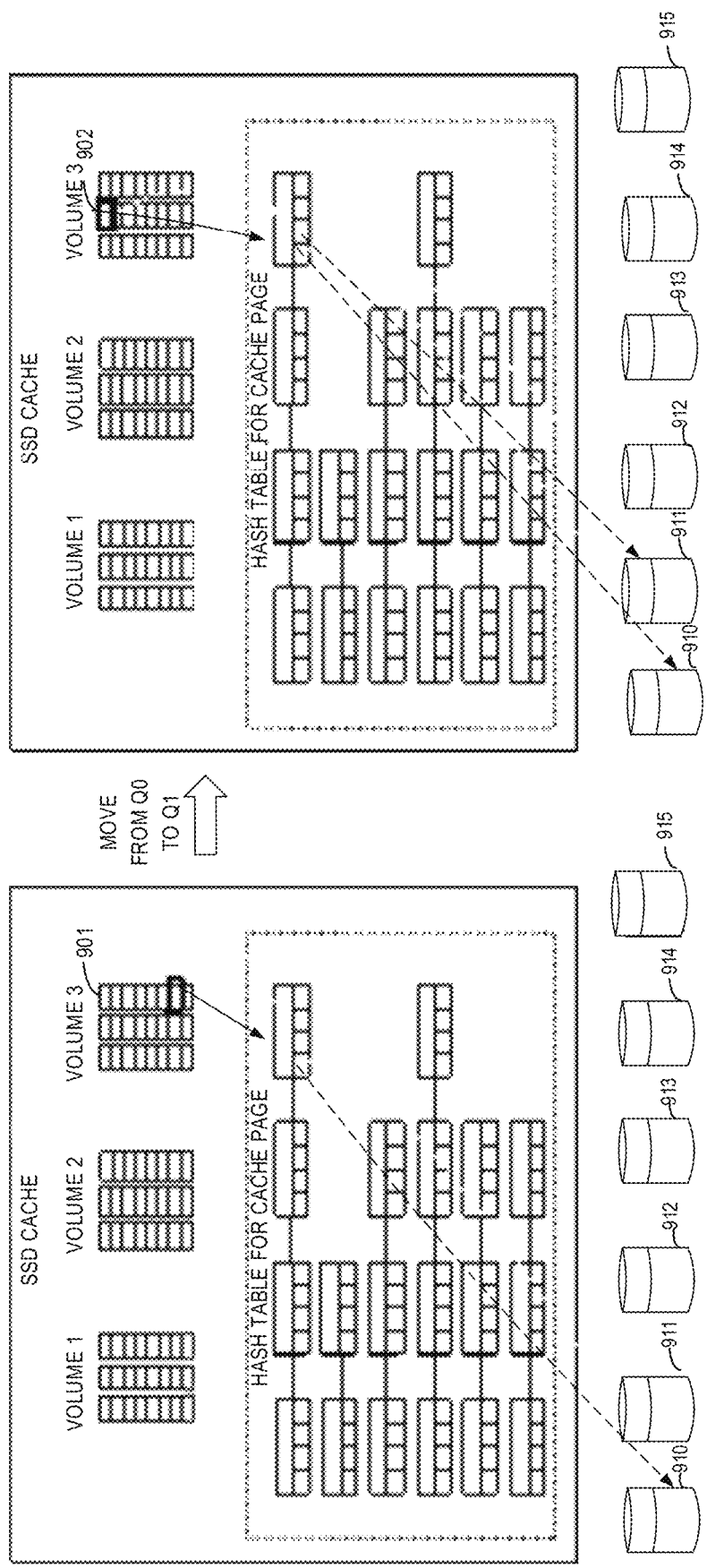
FIG. 9 is a schematic diagram of dynamically moving queues where the cache pages are located based on changes of access frequency according to the example embodiments of the present disclosure.

To better understand the scheme of dynamically moving the queues where the cache pages are located based on access frequency, reference can be made to FIG. 9. FIG. 9 shows a schematic diagram of dynamically moving the queues where the cache pages are located based on changes of access frequency according to the example embodiments of the present disclosure. As illustrated, a page is originally located in queue 901 of volume 3 and mapped to the solid-state disk 910. As the access frequency for the page increases above a predetermined threshold later, the page is moved to the queue 902 so that the page is mapped to the solid-state disk 910 and the solid-state disk 911 so as to have copies on the solid-state disk 910 and the solid-state disk 911.

In the example embodiments of the present disclosure, the solid-state disks may be read-preference caches. If a read request for the cache page is received, a solid-state disk may be selected from solid-state disks storing copies of the cache page, and the data to which the read request is targeted may be selected from the selected solid-state disk.

According to method 700, a multi-queue structure is used to store cache pages with different access frequencies so that the cache pages with higher access frequency have copies in more solid-state disks, which can accelerate the access speed for frequently accessed cache pages. Besides, as the frequently accessed cache pages have more than one copy, when one solid-state disk is broken, these cache pages at least have copies in the other solid-state disks, which ensures that the access speed for these cache pages will not be affected. In addition, the scheme of the present disclosure enables dynamically moving the queues where the pages are located based on the change of the access frequency of the cache page over time, thereby meeting the real-time requirement.

Figure 10:
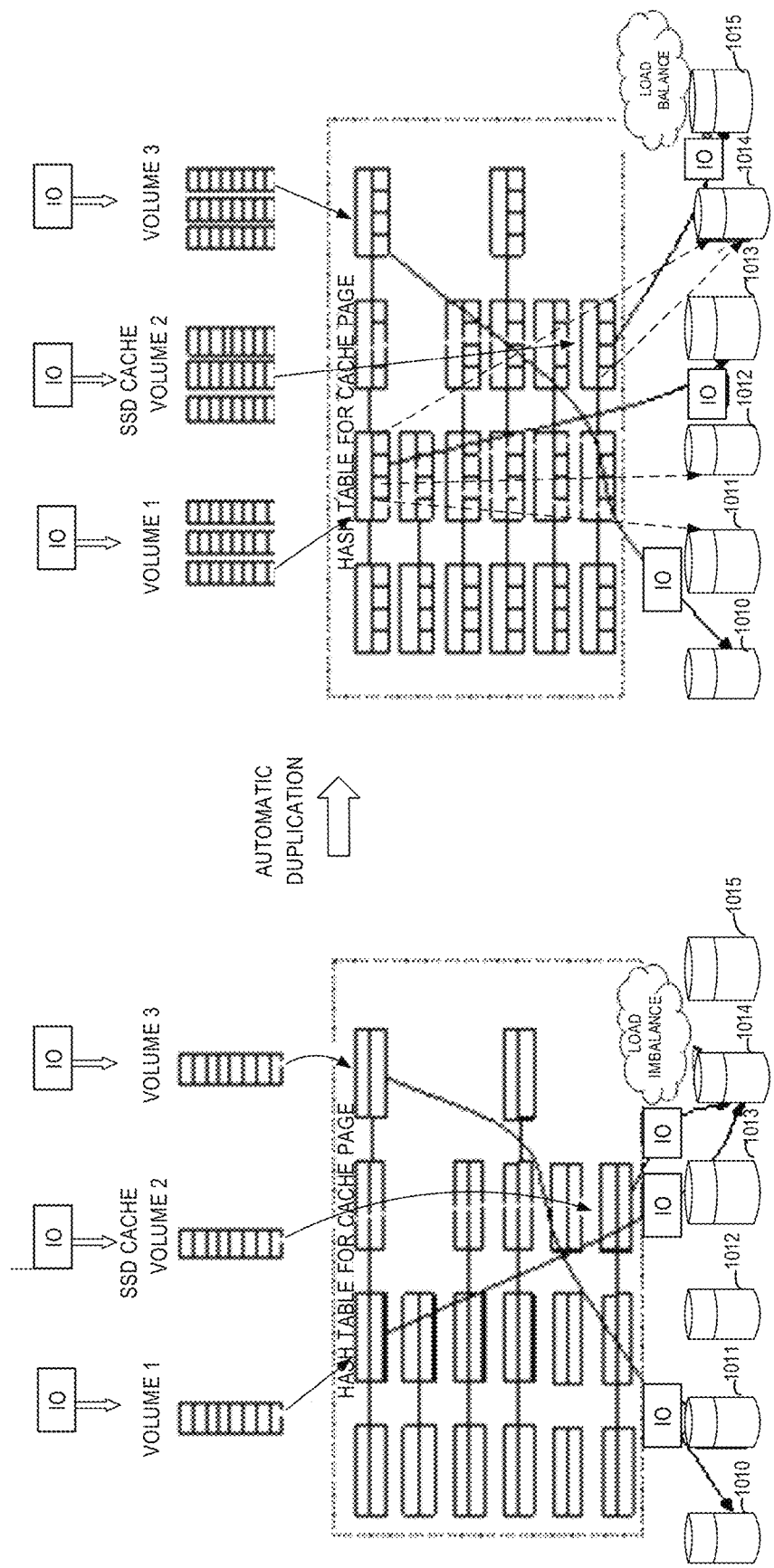
FIG. 10 is a schematic diagram of comparison between the exiting scheme and the scheme provided by the present disclosure in terms of load balance.

Compared with conventional technology, method 700 possesses obvious advantages in load balance and accelerating the speed for responding to the request for more frequently accessed pages. These advantages of method 700 will be described below with reference to FIGS. 10 and 11. FIG. 10 shows a schematic diagram illustrating the comparison in terms of load balance between the existing scheme and the scheme provided by the present disclosure. The left half of FIG. 10 illustrates the existing scheme without using the multi-queue page managing structure and the right half represents the scheme according to the example embodiments of the present disclosure. As illustrated, in the existing scheme, each cache page is mapped to a solid-state disk, for instance, a first page of volume 1 is mapped to the solid-state disk 1014, a second page of volume 2 is mapped to the solid-state disk 1014, and a third page of volume 3 is mapped to the solid-state disk 1010. If an I/O request for the first page and an I/O request for the second page exist simultaneously, then the two I/O requests will be concentrated on the solid-state disk 1014 while the other SSD devices are in the idle state, resulting in load imbalance.

Conversely, according to the scheme of the present disclosure, as the multi-queue structure is adopted, the first page in volume 1 is mapped to the solid-state disk 1011, the solid-state disk 1012, the solid-state disk 1013 and the solid-state disk 1014, the second page in volume 2 is mapped to the solid-state disk 1014 and the solid-state disk 1015, and the third page in volume 3 is mapped to the solid-state disk 1010. In this manner, if an I/O request for the first page and an I/O request for the second page exist simultaneously, then because the first page has copies in four solid-state disks and the second page has copies in two solid-state disks, these I/O requests will not be concentrated in the solid-state disk 1014, but scattered to other solid-state disks (such as solid-state disk 1013 and solid-state disk 1015), thereby achieving load balance.

Figure 11:
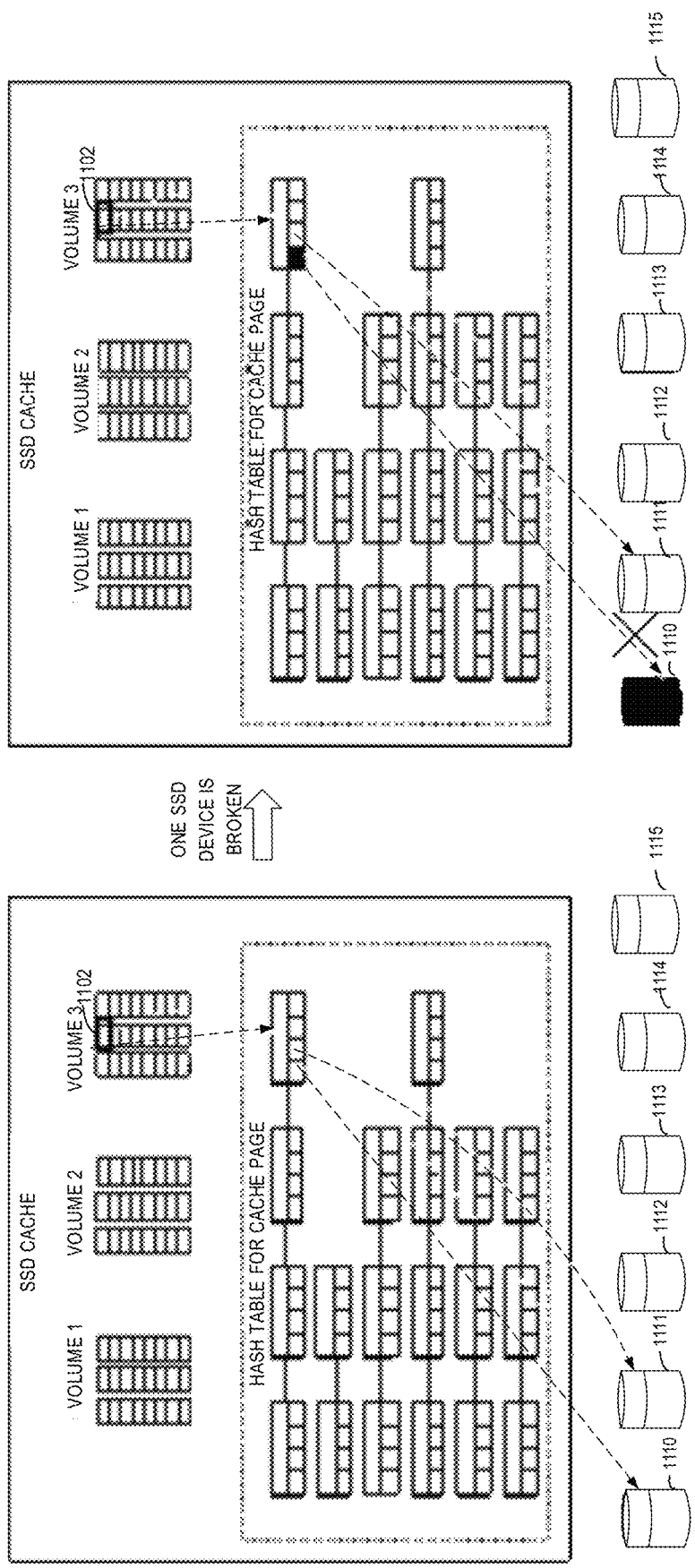
FIG. 11 is a schematic diagram illustrating a condition when one SSD is broken according to the example embodiments of the present disclosure.

Apart from the advantage of load balance, the scheme of the present disclosure also has other advantages. For instance, because cache pages with higher access frequency have copies in more solid-state disks, for frequently accessed cache pages, it is possible to accelerate access to the page. Besides, since the cache pages with higher access frequency have more than one copy, when one solid-state disk is broken, these cache pages have copies at least in the other solid-state disks, which ensures that the speed for accessing these cache pages will not be affected. FIG. 11 shows a schematic diagram when one solid-state disk is broken according to the example embodiments of the present disclosure. As illustrated, since the pages in queue 1101 of volume 3 are mapped to two solid-state disks, namely, solid-state disk 1110 and solid-state disk 1111, even if the solid-state disk 1110 is broken, it is also possible to read data from the solid-state disk 1111 without reading data from HHD, thereby ensuring the speed for responding to the frequently accessed pages.

Figure 12:
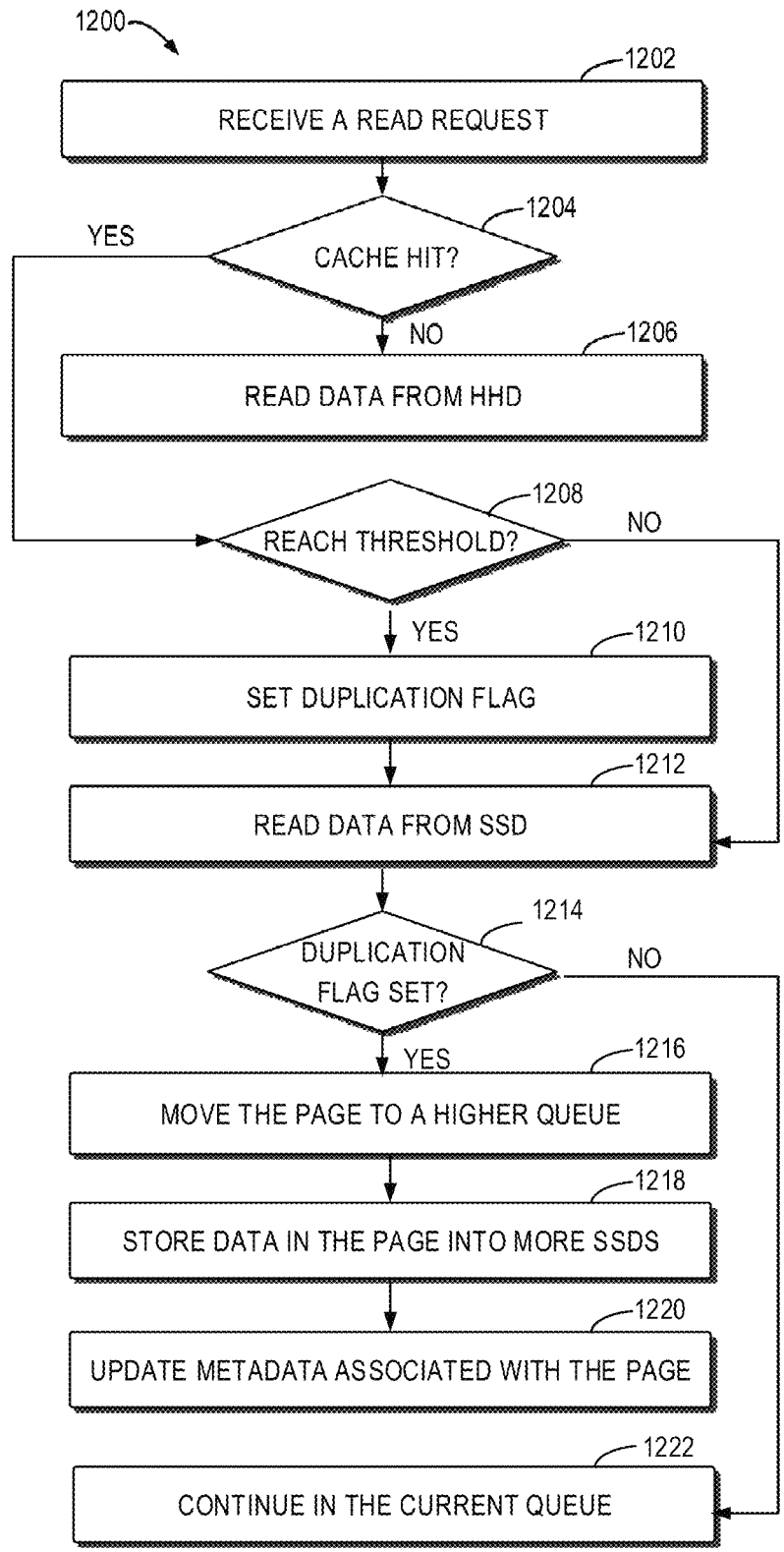
FIG. 12 is a flowchart illustrating a method of cache management according to the example embodiments of the present disclosure.

FIG. 12 is a flowchart illustrating a cache management method 1200 according to the embodiments of the present disclosure. Method 1200 is a specific implementation of the method 700 in actual application about how to dynamically adjust the queues where the cache pages are located. It shall be appreciated by those skilled in the art that without departing from the scope of the present disclosure, method 700 may have a plurality of specific implementations, and not limited to the implementation illustrated in FIG. 12.

At block 1202, a read request for a page can be received. At block 1204, it can be determined if the read request hits the cache, for instance, the SSD cache. If it is determined at block 1204 that the cache is not hit, then method 1200 proceeds to block 1206 at which the data to which the read request is targeted may be read from the HHD device.

If it is determined at block 1204 that the SSD cache is hit, then method 1200 proceeds to block 1208 at which it may be determined whether the access frequency for the page exceeds a predetermined threshold. If it is determined at block 1208 that the access frequency for the page exceeds the predetermined threshold, then method 1200 proceeds to block 1210, otherwise it proceeds to block 1212.

At block 1210, a duplication flag may be set, which indicating that the page should be moved from the current queue to a queue of a higher level. At block 1212, the data to which the read request is targeted may be read from any solid-state disk storing the copy of the page. In the example embodiments of the present disclosure, one of the solid-state disks storing the copy of the page may be selected, and then the data may be read from the selected solid-state disk. For example, the solid-state disk may be selected based on the consideration of load balance. At block 1214, it can be determined if the duplication flag is set. If it is determined at block 1214 that the duplication flag is not set, then method 1200 may proceed to block 1222 at which the page keeps being located in the current queue.

If it is determined at block 1214 that the duplication flag has been set, then method 1200 may proceed to block 1216 at which the page may be moved to a queue with a higher level. At block 1218, data in the page may be stored into more solid-state disks so that the page has copies in more solid-state disks. At block 1220, metadata associated with the page, such as mapping information associated with the page, may be updated.

Figure 13:
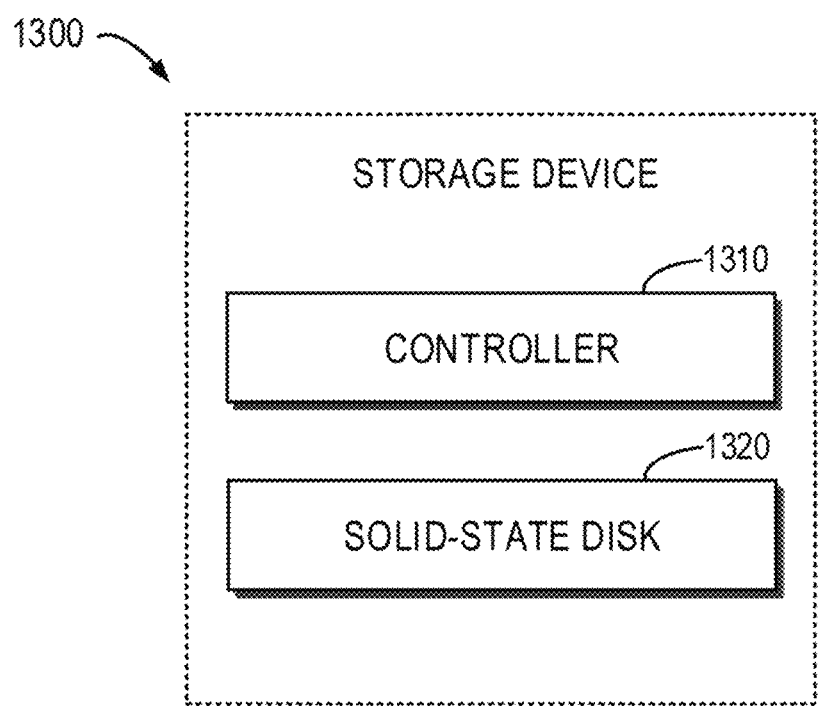
FIG. 13 is a block diagram illustrating a storage system according to the example embodiments of the present disclosure.

FIG. 13 shows a block diagram illustrating a storage system 1300 according to the example embodiments of the present disclosure. The storage system 1300 may include a controller 1310 and a plurality of solid-state disks 1320. In the example embodiments, the plurality of solid-state disks 1320 may be read-preference caches. The storage system 1300 may further include HDD devices not shown.

The controller 1310 may be configured to determine an access frequency for each of a plurality of cache pages in the storage system 1300. The controller 1310 may be further configured to organize the plurality of cache pages into a plurality of queues based on the determined access frequency. The controller 1310 may be further configured to allocate solid-state disks of the plurality of solid state disks to the plurality of queues based on the determined access frequency so that the queues where the pages with higher access frequency are located have more solid state disks.

In the example embodiments, the plurality of queues have a first queue allocated with a first number of solid-state disks and a second queue allocated with a second number of solid-state disks, where the first number is larger than the second number. The controller 1310 may be further configured to determine a first access frequency for the first page in the first queue. The controller 1310 may be further configured to adjust the first page in the first queue to the second queue in response to the first access frequency decreasing below the first threshold so that the copies of the first page are stored in the second number of solid-state disks. The controller 1320 may be further configured to determine a second access frequency of the second page in the second queue. The controller 1320 may be further configured to adjust the second page from the second queue to the first queue in response to the second access frequency increasing above the second threshold so that the copies of the second page are stored in the first number of solid-state disks.

In the example embodiments of the present disclosure, the controller 1310 may be further configured to receive the read request for the cache page. The controller 1310 may be further configured to select one of the solid-state disks storing copies of the cache page, and read data from the selected solid state disk.

Figure 14:
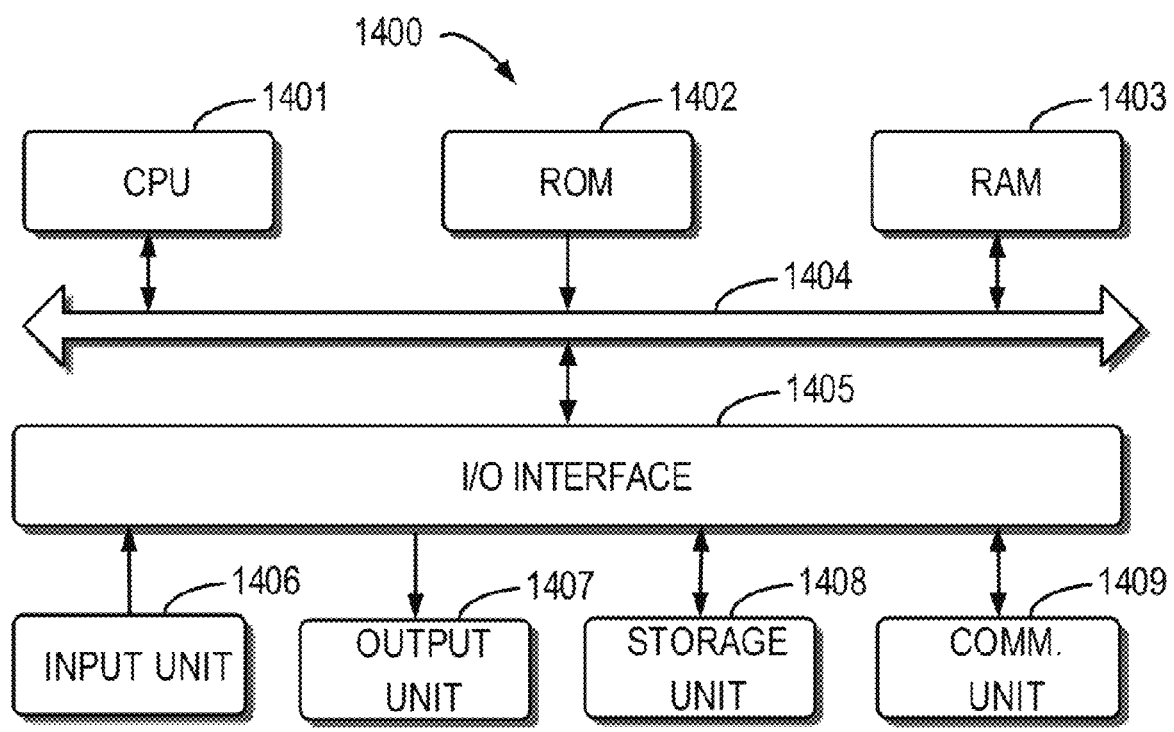
FIG. 14 is a block diagram illustrating an illustrative device that can be used to implement embodiments of the present disclosure.

FIG. 14 is a schematic block diagram illustrating an example device 1400 capable of implementing embodiments of the present disclosure. As illustrated, the device 1400 includes a central processing unit (CPU) 1401 which can execute various appropriate actions and processing based on the computer program instructions stored in a read-only memory (ROM) 1402 or the computer program instructions loaded into a random access memory (RAM) 1403 from a storage unit 1408. The RAM 1403 also stores all kinds of programs and data required by operating the storage device 1400. CPU 1401, ROM 1402 and RAM 1403 are connected to each other via a bus 1404 to which an input/output (I/O) interface 1405 is also connected.

A plurality of components in the device 1400 are connected to the I/O interface 1405, including: an input unit 1406, such as keyboard, mouse and the like; an output unit 1407, such as various types of displays, loudspeakers and the like; a storage unit 1408, such as magnetic disk, optical disk and the like; and a communication unit 1409, such as network card, modem, wireless communication transceiver and the like. The communication unit 1409 allows the device 1400 to exchange information/data with other devices through computer networks such as Internet and/or various telecommunication networks.

Each procedure and processing described above, such as process 700 and/or process 1200, can be executed by a processing unit 1401. For example, in some embodiments, process 700 and/or process 1200 can be implemented as computer software programs or computer program products, which are tangibly included in a machine-readable medium, such as storage unit 1408. In some embodiments, the computer program can be partially or completely loaded and/or installed to the device 1400 via ROM 1402 and/or the communication unit 1409. When the computer program is loaded to RAM 1403 and executed by CPU 1401, one or more steps of the above described process 700 and/or process 1200 are implemented. Alternatively, in the other embodiments, CPU 1401 may be configured to implement the process 700 and/or process 1200 in any other proper manner (such as by means of firmware).

Those skilled in the art shall understand that each step of the method of the present disclosure may be implemented by a universal computing device, and integrated on a single computing device, or distributed on the network comprised by a plurality of computing devices. Optionally, they can be implemented by program codes executable by the computing device so that they can be stored in a storage device and implemented by a computing device, or they can be manufactured separately into integrated circuit modules, or a plurality of modules or steps therein may be manufactured into a single integrated circuit module. In this manner, the present disclosure is not limited to any particular combination of hardware and software.

It will be understood that although various units or sub-units of the device have been mentioned in the above detailed description, such partitioning is only illustrative rather than limiting. In practice, according to the embodiments of the present disclosure, the features and functions of two or more units described above may be embodied in one block. In turn, the features and functions of one unit described above may be further embodied in more units.

The above only describes the optional embodiments of the present disclosure which are not used to limit the present disclosure. For those skilled in the art, various modifications and changes can be made to the present disclosure. The scope of protection of the present disclosure is intended to cover various modifications and equivalent arrangements and improvement included in the spirit and principle of the present disclosure.

We claim:

1. A method of cache management comprising:
   determining an access frequency for each of a plurality of cache pages in a cache of a storage system, the storage system including the cache and an HDD (hard disk drive) matrix below the cache;
   organizing, based on the access frequency, the plurality of cache pages into a plurality of queues;
   allocating, based on the access frequency, solid-state disks for the plurality of queues, so that a queue where a page with higher access frequency is located has more solid-state disks than has a queue where a page with lower access frequency is located; and
   dynamically moving pages among queues of the plurality of queues based on changes in access frequency over time,
   wherein pages belonging to queues having higher access frequencies are stored a greater number of times in respective solid-state disks than are pages belonging to queues having lower access frequencies, such that data in pages accessed at higher frequencies is available from a greater number of solid-state disks than is data in pages accessed at lower frequencies, wherein one of the solid-state disks stores pages that belong to multiple queues having different access frequency.

2. The method according to claim 1, wherein the plurality of queues comprise a first queue allocated with a first number of solid-state disks and a second queue allocated with a second number of solid-state disks, the first number being larger than the second number.

3. The method according to claim 2, further comprising:
determining a first access frequency for a first page in the first queue; and
in response to the first access frequency decreasing below a first threshold, moving the first page from the first queue to the second queue.

4. The method according to claim 2, further comprising:
determining a second access frequency for a second page in the second queue; and
in response to the second access frequency increasing above a second threshold, moving the second page from the second queue to the first queue.

5. The method according to claim 1, wherein the solid-state disks are read-preference caches.

6. The method according to claim 3, wherein moving the first page from the first queue to the second queue comprises:
storing data in the first page into the second number of solid-state disks; and
updating metadata associated with the first page.

7. The method according to claim 4, wherein moving the second page from the second queue to the first queue comprises:
storing data in the second page into the first number of solid-state disks; and
updating metadata associated with the second page.

8. The method according to claim 2, further comprising:
receiving a read request for the first page in the first queue;
selecting a solid-state disk from the first number of solid state disks; and
reading, from the selected solid-state disk, data to which the read request is targeted.

9. A storage system, comprising:
a cache including a plurality of solid state disks;
an HDD (hard disk drive) matrix below the cache; and
a controller configured to:
determine access frequency for each of a plurality of cache pages in the storage system;
organize, based on the access frequency, the plurality of cache pages into a plurality of queues;
allocate, based on the access frequency, solid-state disks of the plurality of solid-state disks to the plurality of queues, so that a queue where a page with higher access frequency is located has more solid-state disks than has a queue where a page with lower access frequency is located; and
dynamically move pages among queues of the plurality of queues based on changes in access frequency over time,
wherein one of the solid-state disks stores pages that belong to multiple queues having different access frequency.

10. The storage system according to claim 9, wherein the plurality of queues comprise a first queue allocated with a first number of solid-state disks and a second queue allocated with a second number of solid-state disks, the first number being larger than the second number.

11. The storage system according to claim 10, wherein the controller is further configured to:
determine a first access frequency for a first page in the first queue; and
in response to the first access frequency decreasing below a first threshold, move the first page from the first queue to the second queue.

12. The storage system according to claim 10, wherein the controller is further configured to:
determine a second access frequency for a second page in the second queue; and
in response to the second access frequency increasing above a second threshold, move the second page from the second queue to the first queue.

13. The storage system according to claim 9, wherein the plurality of solid state disks are read-preference caches.

14. The storage system according to claim 11, wherein moving the first page from the first queue to the second queue comprises:
storing data in the first page into the second number of solid-state disks; and
updating metadata associated with the first page.

15. The storage system according to claim 12, wherein moving the second page from the second queue to the first queue comprises:
storing data in the second page into the first number of solid-state disks; and
updating metadata associated with the second page.

16. The storage system according to claim 10, wherein the controller is further configured to:
receive a read request for the first page in the first queue;
select a solid-state disk from the first number of solid-state disks; and
read, from the selected solid-state disk, data to which the read request is targeted.

17. A computer program product for cache management, the computer program product comprising:
a non-transitory computer readable medium encoded with computer-executable code, wherein the code is configured for the execution of:
determining an access frequency for each of a plurality of cache pages in a cache of a storage system, the storage system including the cache and an HDD (hard disk drive) matrix below the cache;
organizing, based on the access frequency, the plurality of cache pages into a plurality of queues;
allocating, based on the access frequency, solid-state disks for the plurality of queues, so that a queue where a page with higher access frequency is located has more solid-state disks than has a queue where a page with lower access frequency is located; and
dynamically moving pages among queues of the plurality of queues based on changes in access frequency over time,
wherein one of the solid-state disks stores pages that belong to multiple queues having different access frequency.

18. The method of claim 1, wherein two solid-state disks that store respective copies of a particular page are not part of a RAID-1 arrangement.

* * * * *